Aug. 30, 1938.  E. GRANGER  2,128,458
ANTISKID ATTACHMENT
Filed Feb. 16, 1938
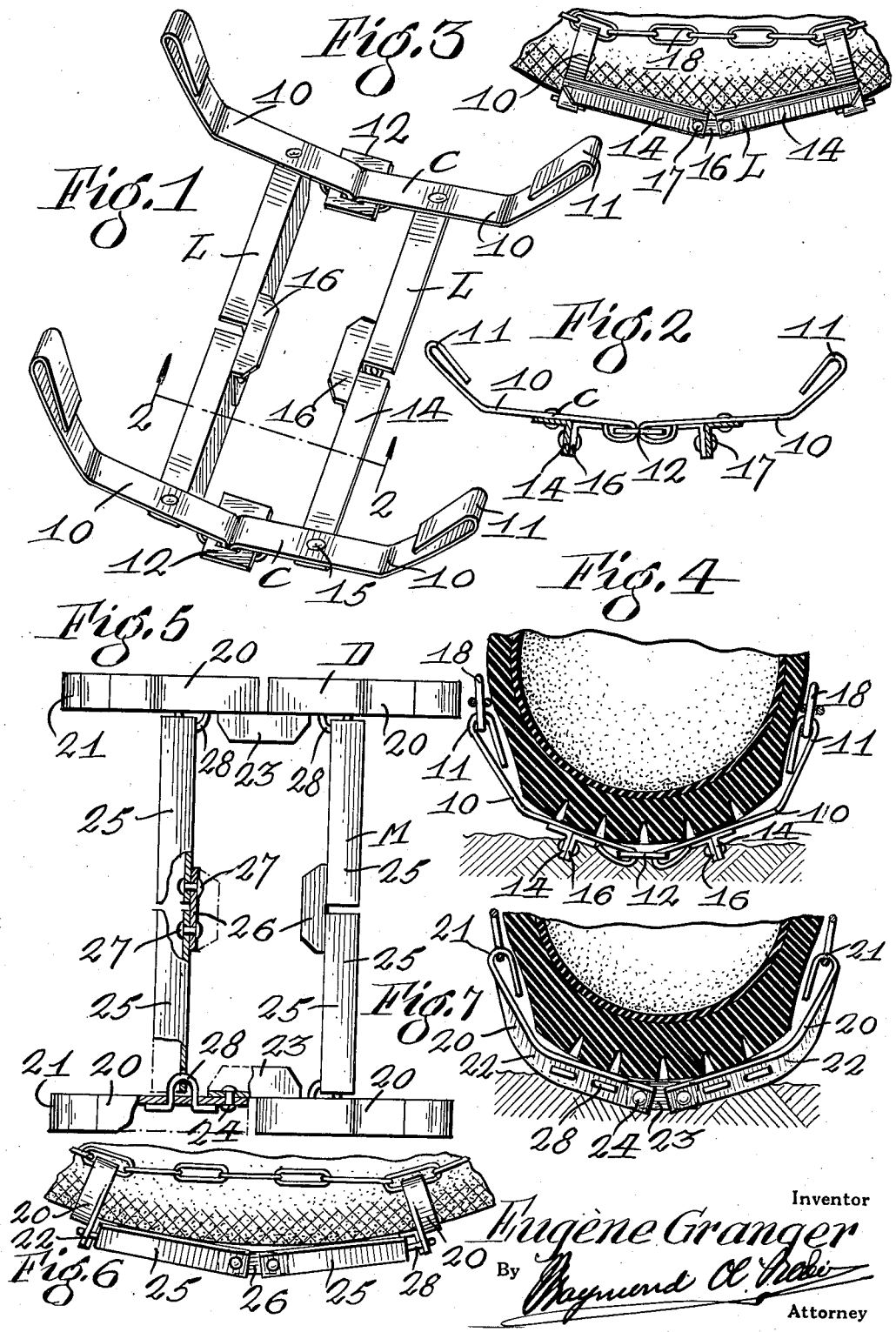
Inventor
Eugène Granger
By
Attorney Patented Aug. 30, 1938

2,128,458

UNITED STATES PATENT OFFICE 2,128,458

ANTISKID ATTACHMENT

Eugène Granger, St. Johns, Quebec, Canada

Application February 16, 1938, Serial No. 190,819

3 Claims. (Cl. 152—228)

The present invention relates to improvements in anti-skid attachments for vehicle wheels.

An important object of the invention is the provision of an anti-skid attachment which is relatively simple and durable in construction.

Another object of the invention is the provision of an anti-skid attachment which is designed to furnish effective means to eliminate or reduce side slip or spinning of a wheel.

Another object of the invention is to provide an anti-skid attachment of the aforesaid character embodying hinged sections constructed to articulate in operation.

Another object of the invention is the provision of an anti-skid attachment of the above character which may be conveniently mounted upon or removed from a vehicle wheel.

Other objects and advantages of the invention will become apparent as the description progresses.

In the accompanying drawing forming a part of this specification and in which like reference characters are employed to designate corresponding parts throughout the same:

Figure 1 is a perspective view of a preferred form of the attachment,

Figure 2 is a transverse section taken on the line 2—2 of Figure 1,

Figure 3 is a side elevational view of the attachment assembled on a wheel,

Figure 4 is a transverse section through the wheel showing the attachment in end elevation, Figure 5 is a top plan view of a modified form of the attachment, Figure 6 is a side elevational view of the same in position on a wheel, and Figure 7 is a transverse section through a wheel showing the attachment in end elevation.

Referring to Figures 1 to 4 inclusive, wherein is illustrated a preferred embodiment of the invention, "C" generally designates each of a pair of cross members of the attachment device. Each of the said cross members is composed of a pair of complementary narrow bars 10 bent longitudinally intermediate their ends, as shown to advantage at Figures 1 and 2, and having the outer end portions bent inward to form U-shaped attaching hooks 11. The inner adjacent ends of the complementary sections 10 are bent over outwardly to engage opposite side portions of a rectangular shaped connecting or hinge link 12, flexibly joining the sections 10 in aligned relation.

Attached to and extending between the cross members C, at right angles thereto, are a pair of parallel relatively narrow longitudinal members L each of which is composed of a pair of complementary sections 14, in the form of rigid straight angle bars. The remote ends of each complementary pair of bar sections 14 are rigidly connected with the respective end forming cross members C by means of tightly fitted rivets 15 or other suitable fastening elements. The adjacent ends of the sections 14, of each longitudinal member L, are disposed to assume spaced relation and are hingedly connected by means of a relatively short angle bar 16 providing a connecting bracket having one flange arranged parallel with one flange of each of the sections and attached thereto by loose rivets or headed bolts 17. This is adapted to provide a flexible structure at the centre of the longitudinally extending members of the attachment.

This attachment is mounted on a vehicle wheel by disposing the cross members C transversely of the tread portion of the wheel, as shown at Figure 3, the flexible connection of the sections and the angular formation enabling these members to substantially conform to the tread and adjacent side wall curvature of the wheel or the tire thereon. The hooks 11 formed on the outer ends of the cross members are disposed to engage links of annular fastening chains 18 arranged at opposite sides of the wheel. The longitudinal members roughly conform to the peripheral curvature of the tread portion of the wheel due to the central hinge joint and are disposed to articulate, that is, are yieldable radially inward upon similar inward movement of the tire.

A modified form of the attachment, shown at Figures 5 to 7 inclusive, embodies cross members D composed of a pair of angularly bent bars 20 having bent over hook forming end portions 21 and similar to the formation of the sections 10 of the preferred form. These cross bars 20 differ from those in the preferred form in that they are formed with a right angular flange 22 disposed to project from the wheel and having a diminishing taper toward the outer end of each bar, as shown to advantage at Figure 7. The inner adjacent ends of the sections 20 are connected by an angle bracket 23 connected by loose pivots or bolts 24 with the sections.

A pair of relatively narrow parallel longitudinal members M extend between and connect with the cross members D and embody a pair of angle bars 25 having their adjacent ends connected through the medium of an angle bracket 26 and rivets 27.

In this form of the device, the remote ends of the longitudinal members M are flexibly connected with the transverse members D this being effected, in the present instance, by means of U-shaped loops or staples 28 having the end portions extended through apertures in the flanges 22 of the cross bars and bent over to fastening position, as clearly shown at Figure 5, and having the intermediate looped portion extended through an aperture in the remote end portion of each of the longitudinal bars 25.

This modification of the anti-skid device is mounted on a wheel in a manner similar to the mounting of the preferred form, but provides greater flexibility and additional gripping flange structure.

The attachment provides an anti-skid device which, although relatively simple and inexpensive in construction, embodies an attachment which is very durable and, due to the arrangement of the component bars and the projecting flanges thereof, is highly efficient in affording traction and for reducing side slip as well as spinning of the wheel to which it is attached.

It is to be understood that the forms of my invention herein shown and described are to be taken as preferred examples of the same, and that various changes as to the shape, size and arrangement of parts may be resorted to without departing from the spirit of the invention or the scope of the subjoined claims.

Having thus described my invention, I claim:—

1. An anti-skid attachment for vehicle wheels comprising a pair of cross members, each of the said cross members including a pair of rigid bars having their adjacent ends hingedly connected and shaped to conform to the transverse curvature of the tread portion of a wheel, means on said transverse members for connecting the same with fastening chains, a pair of longitudinal members connected with and arranged at right angles to the cross members, each of the said longitudinal members including a pair of rigid angle bars, and means hingedly connecting the adjacent ends of the angle bars to form a flexible joint intermediate the ends of the longitudinal members.

2. An anti-skid attachment for vehicle wheels comprising a pair of end cross members, each of the said cross members including a pair of rigid bar sections having their adjacent ends hingedly connected, a pair of longitudinal members rigidly connected with and extending between the cross members, each of the said longitudinal members including a pair of rigid angle bars, and means hingedly connecting the adjacent ends of the angle bars to form a flexible joint intermediate the ends of the longitudinal members.

3. An anti-skid attachment for vehicle wheels comprising a pair of cross members, each of the said cross members including a pair of rigid bars bent in angular form, a link hingedly connecting the adjacent ends of the said bars, a pair of longitudinal members having the end portions hingedly connected with the cross members, each of the said longitudinal members including a pair of angle bars, and a bracket connected by pivot members with the adjacent end portions of the angle bars to form a flexible joint intermediate the remote ends of the said members.

EUGÈNE GRANGER.